United States Patent
Tsuchiya et al.

(10) Patent No.: US 6,795,277 B2
(45) Date of Patent: Sep. 21, 2004

(54) MAGNETIC HEAD AND MAGNETIC DISK DRIVE

(75) Inventors: Yuko Tsuchiya, Tokorozawa (JP); Hiroyuki Hoshiya, Odawara (JP); Yoshiaki Kawato, Tokyo (JP); Katsuro Watanabe, Okawara (JP); Hiroshi Ide, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 163 days.

(21) Appl. No.: 10/067,859

(22) Filed: Feb. 8, 2002

(65) Prior Publication Data

US 2003/0002211 A1 Jan. 2, 2003

(30) Foreign Application Priority Data

Jun. 29, 2001 (JP) ........................................ 2001-198587

(51) Int. Cl.[7] .............................................. G11B 5/265
(52) U.S. Cl. ....................................................... 360/317
(58) Field of Search ................................. 360/317, 125, 360/126

(56) References Cited

U.S. PATENT DOCUMENTS 4,546,398 A * 10/1985 Toda et al. .................. 360/126
5,073,836 A * 12/1991 Gill et al. .................... 360/317
6,636,390 B2 * 10/2003 Funayama et al. ........... 360/317

FOREIGN PATENT DOCUMENTS

JP          04-057205          11/1992

OTHER PUBLICATIONS

IEEE Transactions on Magnetics; "Extremely High Bit Density Recording Wit Single–Pole Perpendicular Head"; Yamamoto, et al.; vol. MAG–23, No. 5. p. 2070–2072(1987).

* cited by examiner

Primary Examiner—Robert S. Tupper
(74) Attorney, Agent, or Firm—Antonelli, Terry, Stout & Kraus, LLP

(57) ABSTRACT

Provided is a thin film single pole head for perpendicular magnetic recording, which has a structure offering a high formatted volume, easy servo, difficulty of influencing a recording pattern on a medium, and capability of shortening processing time. This thin film single pole head for perpendicular magnetic recording is formed on a reproducing head composed of a pair of shield layers formed on a substrate, and a reproducing element formed therebetween. A structure is provided, where an auxiliary pole is not disposed between the reproducing element of the reproducing head and the main pole of a recording head when seen from a surface facing to recording media.

6 Claims, 7 Drawing Sheets

MAGNETIC HEAD AND MAGNETIC DISK DRIVE

BACKGROUND OF THE INVENTION

1. Field of the Invention

The present invention relates to a thin film magnetic head used for recording/reproducing of a magnetic disk drive or the like, in particular a perpendicular magnetic recording head, and a magnetic disk drive using these heads.

2. Prior Art

At present, in a magnetic disk drive used as an external storage for information in information equipment such as a computer or the like, mainly a head which has a read element and a write element is used: a head designed to perform recording by an inductive thin film head, and reproducing by a magnetoresistive effect type head. As a recording system for forming a recording pattern on a medium based on a magnetic flux extending outside a write gap from a recording head, there are two representative types, i.e., an in-plane (longitudinal) recording system and a perpendicular recording system. To achieve a higher recording density, as a future magnetic recording system to replace the conventional in-plane (longitudinal) recording system, a perpendicular magnetic recording system is promising.

In the case of the in-plane (longitudinal) recording system, the magnetic flux extending outside the write gap of the recording head causes a magnetic layer on the medium to be magnetized in a direction equal to/reverse to the advancing direction (trailing direction) of the medium, thus forming a recording pattern on the medium. On the other hand, in the case of the recent perpendicular magnetic recording system devised for the magnetic disk drive or the like, as disclosed in a gazette of Japanese Patent Laid-Open Hei 4 (1992)-57205, a recording head is composed of main and auxiliary poles, a recording medium is mainly a double-layer recording medium, and composed of a recording layer (perpendicular magnetization layer) formed in a side near the recording head, and a soft magnetic underlayer. The main pole, the soft magnetic underlayer and the auxiliary pole of the recording head are magnetically coupled together to form a closed magnetic flux loop. According to this system, if a distance between the main pole of the recording head and the soft magnetic underlayer of the medium is sufficiently smaller than a space between the main and auxiliary poles, a magnetic flux leaked from the main pole magnetizes the recording layer in a film thickness direction, i.e., perpendicularly to a medium surface, passes through the soft magnetic underlayer, and returns to the auxiliary pole. Thus, a recording pattern on the medium is formed in the film thickness direction of the medium, which is the origin of the naming of the perpendicular magnetic recording.

Note that, in the perpendicular magnetic recording system, as in the case of the in-plane (longitudinal) magnetic recording system, as a reproducing head, a magnetoresistive effect element, in particular a GMR head using a huge magnetoresistive effect, a TMR head using a tunnel magnetoresistive effect or the like is used.

FIG. 1 schematically shows a structure of a perpendicular magnetic recording head of the conventional type, which has a read element and a write element. In FIG. 1, the recording head for perpendicular magnetic recording has a structure of being laminated on a reproducing head using a magnetoresistive effect element. The thin film head for perpendicular magnetic recording in FIG. 1 is composed of main and auxiliary poles 1 and 2, a conductor coil 3, and an insulating film 4 for insulating the conductor coil 3, and the main and auxiliary poles 1 and 2. In the head for perpendicular magnetic recording, for the purpose of setting the width of a recording track where signals are recorded by the main pole to be narrow, and a density of a magnetic flux leaked from the main pole to be high, the main pole may be trimmed by FIB or the like after the formation of the main pole by electroplating or the like. Consequently, after the formation of the reproducing head on a substrate, the auxiliary pole, and the main pole are often formed in this order. A big difference between the recording head for perpendicular magnetic recording and the recording head for in-plane magnetic recording is that the head for in-plane recording has a very narrow space (e.g., 0.2 $\mu$m) between the main and auxiliary poles when seen from the surface facing to the recording medium, while the head for perpendicular magnetic recording has a larger space (5 to 10 $\mu$m).

In FIG. 1, the reproducing head includes a magnetoresistive effect film 5 having electrical resistance changed depending on an applied magnetic field, a magnetoresistive effect element composed of a magnetic domain control film 6 and an electrode 7, an upper shield layer 2 and a lower shield layer 8 for cutting off unnecessary magnetic fields, and a not-shown insulating film for insulating the magnetoresistive effect element and the shields from each other. In the head which has the read element and the write element, shown in FIG. 1, the auxiliary pole 2 of the recording head also serves as an upper shield for the reproducing head. If the auxiliary pole of the recording head and the upper shield of the reproducing head are separately provided, a magnetic separation layer is present between these layers made of magnetic materials.

In the magnetic disk drive, there is a magnetic medium rotating on its axis, and there is a slider includes the foregoing head having the read and write elements mounted. This slider records/reproduces a signal while floating with a constant space kept to the medium surface. In this case, a track for recording/reproducing a signal has a concentric circular structure. Positioning must be controlled to accurately record/reproduce a signal (magnetization pattern) in a track on the medium. Currently, positioning control using a sector servo system is mainly used. In the sector servo system, a circumferential track is divided into a plurality of sectors, a servo area is provided at the head of each sector, after this area, a data area is provided for recording a signal. When recording/reproducing is performed, the magnetic head is positioned on the track by using a servo pattern provided in the sector region. In addition, in the current magnetic disk drive, the root of a suspension having a slider mounted on its tip is fixed, and the suspension has a structure of being moved around its fixed point. Thus, when a signal on a track located near the internal circumference of external circumference of the medium is recorded/reproduced, the slider has a yaw angle with respect to the track.

Compared with the head for in-plane recording, the conventional thin film single pole head for perpendicular magnetic recording has a larger space of 5 to 10 $\mu$m between the main and auxiliary poles when seen from a surface facing to the medium, and the reproducing head, the auxiliary pole, and the main pole are formed in this order on the substrate. Thus, a space between the main pole and the reproducing head is 10 $\mu$m or more. In the sector servo system, the servo pattern recorded in the servo area is detected by the reproducing head, and positioned on the track. After this operation, a signal is recorded in the data area on the track. When a space between the main pole and the reproducing head becomes wider as described above, it takes time for the recording head to reach the data area after the detection of the servo pattern in the servo area. In other words, a length of an area present between the servo area and the data area, which cannot be used for signal recording, is increased. Consequently, in the perpendicular recording system using the conventional thin film single pole head for perpendicular magnetic recording, compared with the in-plane (longitudinal) recording system, the occupation ratio of the data area per track, i.e., a formatted volume, is reduced.

When a signal is recorded on the track, the slider must be moved in such a way as to move the recording head onto the track after the detection of the servo pattern by the reproducing head located on the track. As a yaw angle is set in a track near the internal circumference or external circumference of the medium, the moving distance of the slider is increased, making it difficult to perform positioning control (servo). When a space is widened between the main pole and the reproducing head, the moving distance of the slider is increased more, making it difficult to design a servo system. Thus, in the perpendicular recording system using the conventional thin film single pole head for perpendicular magnetic recording, servo is more difficult compared with the in-plane (longitudinal) recording system.

In addition, in the perpendicular recording system using the conventional thin film single pole head for perpendicular magnetic recording, the auxiliary pole is formed so as to be on the same recording track of the main pole. Accordingly, as represented by erasure after recording, the recording pattern on the medium is easily affected by a magnetic flux supplied from the main pole, passed through the soft magnetic underlayer of the medium, and returned to the auxiliary pole. Further, since the main pole is laminated after the formation of the auxiliary pole, the number of process steps is increased, extending time for forming the recording head.

Note that, IEEE Trans, Magn., vol. MAG-23, No. 5, pp. 2070–2072 (1987) describes a bulkhead including a plurality of auxiliary poles disposed around a main pole. However, the head described therein is one for both recording and reproducing, and has no elements dedicated for reproducing, such as an MR element. Thus, nothing is suggested regarding a problem caused by the large space between the reproducing element and the main pole, which the invention tries to solve, or a specific method of reducing the space between the reproducing element and the main pole.

SUMMARY OF THE INVENTION

The present invention was made with the foregoing problems in mind, and objects of the invention are to provide a thin film single pole head for perpendicular magnetic recording, which has a larger formatted volume than that of the conventional thin film single pole head for perpendicular magnetic recording, and easier servo, and a magnetic disk drive using the same. Other objects of the invention are to provide a thin film pole head for perpendicular magnetic recording, which is capable of making it difficult for a return flux to disturb a recording pattern on a medium like that represented by erasure after recording, and a magnetic disk drive using the same. Further, other objects of the invention are to provide a thin film single pole head for perpendicular magnetic recording, which has a structure capable of shortening process time, and a magnetic disk drive using the same.

In order to achieve the foregoing objects, the present invention provides a thin film single pole head for perpendicular magnetic recording which has a read element and a write element, which comprises a reproducing head and a recording head, and has a structure where no auxiliary poles are disposed between the reproducing element of the reproducing head and the main pole of the recording head when seen from a surface facing to recording media.

With regard to the disposition example of a main pole and an auxiliary pole when seen from the surface facing to the medium to achieve the objects of the invention, various dispositions like those shown in FIGS. 2 to 6 can be employed. In FIGS. 2 to 6, the thin film single pole head for perpendicular magnetic recording is formed above the reproducing head, which is composed of a pair of shield layers 10 and 12 formed on a substrate 13, and a reproducing element 11 formed between 10 and 12.

First, as shown in FIG. 2, one auxiliary pole 9 magnetically connected to a main pole 1 may be disposed in a direction orthogonal to a trailing direction 14 with respect to the main pole 1. Secondly, as shown in FIG. 3, the number of auxiliary poles magnetically connected to the main pole 1 may be two, and the two auxiliary poles 9 and 17 sandwiching the main pole 1 may be disposed in the direction orthogonal to the trailing direction 14. Also, as shown in FIG. 4, the number of auxiliary poles magnetically connected to the main pole 1 may be three. In this case, the first auxiliary pole 9 and the second auxiliary pole 17 may be disposed in such a manner that their surfaces near the reproducing head are on the same straight line 15 roughly orthogonal to the trailing direction 14. The third auxiliary pole 18 may be disposed in such a manner that a straight line 19 connecting the center of the third auxiliary pole 18 with the center of the main pole 1 is in a direction roughly parallel to the trailing direction 14. An area of the third auxiliary pole 18 may be larger than that of each of the first and second auxiliary poles 9 and 17.

In FIGS. 2 to 4, the main and auxiliary poles are disposed when seen from the surface facing to the medium such that the surfaces of the main pole and the auxiliary pole near the reproducing head are on the same straight line 15. However, other disposing methods are possible. For example, when seen from the surface facing to the medium as shown in FIG. 5, a straight line 20 connecting the center of the main pole with the center of the auxiliary pole can be set in a direction roughly orthogonal to the trailing direction 14. In addition, when there are two or more auxiliary poles, as shown in FIG. 6, the surfaces of the auxiliary poles near the reproducing head can be set on the same straight line 15 in a direction orthogonal to the trailing direction 14, and the surface of the main pole 1 near the reproducing head can be disposed not to be on the same straight line 15. In the case of the disposition of FIG. 6, a distance from the reproducing element 11 to the upper surface of the main pole 1 is smaller than that from the reproducing element 11 to each of the auxiliary poles 9 and 17. It should be noted that the dispositions of the main and auxiliary poles, and the number of auxiliary poles are not limited to the fore going.

When the main and auxiliary poles are disposed as shown in FIGS. 2 to 6, preferably, a straight line connecting the center of the reproducing element 11 constituting the reproducing head with the center of the main pole 1 should be set to 5 $\mu$m or lower, more preferably 3 $\mu$m or lower, when it is projected in the trailing direction 14. By narrowing a space between the main pole and the reproducing head as much as possible in the above manner, it is possible to increase the formatted volume of a recording track, and facilitate servo.

The dispositions of the main and auxiliary poles shown in FIGS. 2 to 6 represents one where no auxiliary poles are present between the reproducing element and the main pole of the recording head when seen from the surface facing to recording media. When the main and auxiliary poles are disposed in such a manner, the auxiliary poles can be disposed to be present on a track different from the recording track, on which a recording pattern is formed by the main pole. In other words, a space d between the main and an auxiliary pole can be set larger than a recording track width on the medium. Preferably, the space d between the main and auxiliary poles should be set in the range between 0.5 $\mu$m and 1 $\mu$m so as to be larger than the recording track width. However, the space d can be set shorter or longer than the above. Thus, when the space d between the main and auxiliary poles is set larger than the recording track width, as shown in FIG. 7, a magnetic flux 21 leaked from the main pole 1 magnetizes the recording layer 23 of the medium 22 in a film thickness direction, i.e., perpendicularly to the medium surface, passes through a soft magnetic underlayer 24, and returns to the auxiliary pole 9 formed on a recording track 26 different from a recording track 25 under the main pole. Thus, the possibility of recording pattern disturbance caused by the return magnetic flux like that represented by erasure after recording is reduced. Moreover, by increasing the number of auxiliary poles to two or more, a density of a magnetic flux returning to the auxiliary poles can be reduced more compared with the case of one auxiliary pole. Thus, it is possible to further prevent the disturbance phenomena of the recording pattern like that represented by erasure after recording.

As shown in FIGS. 2 to 4, when seen from the surface facing to the medium, if the respective poles are disposed such that the surfaces of the main pole 1 and the auxiliary pole 9 (17) near the reproducing head are on the same straight line 15, the main and auxiliary poles can be formed on the same film which flattens the roughness of underlayers and shields the magnetic interaction between a read element and a write element. For the film which flattens the roughness of underlayers and shields the magnetic interaction between a read element and a write element, a film made of $Al_2O_3$, a film made of $SiO_2$, or a mixed film containing $Al_2O_3$ and $SiO_2$ can be used. A thickness of the film which flattens the roughness of underlayers and shields the magnetic interaction between a read element and a write element in the trailing direction only needs to be about 0.5 $\mu$m to 1 $\mu$m. Thus, by forming the main and auxiliary poles on the same film which flattens the roughness of underlayers and shields the magnetic interaction between a read element and a write element, the number of process steps of manufacturing the recording head can be reduced, making it possible to shorten process time as a result.

In the case of disposing the main and auxiliary poles as shown in FIG. 4, when seen from the surface facing to recording media, if the third auxiliary pole 18 is formed above the first and second auxiliary poles 9, 17 and the main pole 1, and an area of the third auxiliary pole 18 is set larger than that of the first or second auxiliary poles 9 or 17, the third auxiliary pole 18 can also function as a shield for preventing an antenna effect with respect to the recording head. The antenna effect is a problem intrinsic to perpendicular recording. That is, the antenna effect is a phenomenon, where while the recording head is not engaged in a recording operation, a magnetic flux from a magnetic field generation source inside/outside a hard disk case enters the main and auxiliary poles, and consequently disturbs the recording pattern on the medium. The antenna effect can be considered as a kind of erasure after recording. As shown in FIG. 4, by disposing the auxiliary pole occupying a large area around the main pole to serve also as a shield, it is possible to prevent the foregoing antenna effect.

In the case of disposing the main and auxiliary poles as shown in FIG. 2, a coil which creates a magnetic flux used for recording by the main pole can be formed like that shown in FIG. 8. Specifically, a magnetic film pillar 27 connected to the main pole 1 is formed so as to be parallel to the surface facing to recording media, and a coil which creates a magnetic flux 3 is formed so as to surround the same. Since the coil which creates the magnetic flux 3 can be disposed in a position near the tip of the surface of the main pole 1 facing to the medium, this shape enables recording magnetic field intensity to be enhanced. Even in the case of disposing the main and auxiliary poles different from that shown in FIG. 2, a coil which creates a magnetic flux can be formed so as to surround the magnetic film pillar magnetically connected to the main pole, and formed to be parallel to the surface facing to recording media. Also, the coil disposition other than that shown in FIG. 8 is possible.

In the case of the perpendicular recording head constructed like that shown in FIG. 2, as a reproducing head, it is possible to use a magnetoresistive effect element having electrical resistance changed corresponding to the change of an applied magnetic field. In this case, preferably, a huge magnetoresistive effect element using a huge magnetoresistive effect or a tunnel magnetoresistive effect element using a tunnel magnetoresistive effect should be used. However, magnetoresistive effect elements other than the above can be used.

FIG. 11 shows the formation example of a coil which creates a magnetic flux for the main pole when the main and auxiliary poles are disposed as shown in FIG. 5. This coil disposition is basically similar to that of FIG. 8. It should be noted, however, that a film which shields the magnetic interaction between a read element and a write element between the main pole 1 and an upper shield 10 has a thickness thicker than that between the auxiliary pole 9 and the upper shield 10.

FIG. 12 shows the formation example of a coil which creates a magnetic flux for the main pole when the main and auxiliary poles are disposed as shown in FIG. 6. The main pole 1 is formed in a position nearer the upper shield 10 than the auxiliary poles 9 and 17. Magnetic film pillar parallel to the surface facing to recording media were connected to the poles 1, 9 and 17. The main pole, and the first and second auxiliary poles were magnetically coupled together by connecting these three pillars in the upper sides. Then, a coil which creates a magnetic flux 3 was formed so as to surround the magnetic film pillar 27 connected to the main pole 1.

Summing up the foregoing, the magnetic head of the invention comprises: a reproducing head provided with a pair of magnetic shield layers and a reproducing element formed between these shield layers; and a head for perpendicular magnetic recording, provided with main and auxiliary poles made of thin films of soft magnetic materials, which are disposed to face each other through a magnetic gap in a surface facing to recording media, and connected inside, and a coil magnetically coupled to a magnetic circuit composed of the main and auxiliary poles. In this case, the auxiliary pole is disposed in an area excluding a portion between the reproducing element and the main pole when seen from the surface facing to recording media.

When seen from the surface facing to recording media, preferably, a straight line connecting a center of the reproducing element with a center of the main pole has a length of 5 $\mu$m or lower when it is projected in a trailing direction. When the length exceeds 5 $\mu$m, servo becomes difficult.

The magnetic head according to the first aspect of the invention comprises: one or a plurality of auxiliary poles. In this case, when seen from the surface facing to recording media, a straight line connecting at least one auxiliary pole with a center of the main pole is non-parallel to a trailing direction.

The magnetic head according to another aspect of the invention, comprises: one or a plurality of auxiliary poles. In this case, the main pole and the auxiliary pole are disposed in a manner that a part or all parts of at least one auxiliary pole face a recording track different from a recording track of the recording medium, to which the main pole faces.

The magnetic head according to yet another aspect of the invention, comprises: first, second and third auxiliary poles. In this case, when seen from the surface facing to recording media, a straight line connecting a center of the first auxiliary pole with a center of the second auxiliary pole is roughly orthogonal to a trailing direction, a straight line connecting a center of the third auxiliary pole with a center of the main pole is roughly parallel to the trailing direction, and an area of the third auxiliary pole is larger than an area of the first or second auxiliary pole.

The magnetic disk drive of the invention comprises: a magnetic disk; disk driving means for driving the magnetic disk; a magnetic head provided with a reproducing head and a recording head; and means for positioning the magnetic head with respect to the magnetic disk. In this case, the magnetic disk is one provided with recording and soft magnetic layers, and designed for perpendicular magnetic recording, and the magnetic head is one specified in any one of the foregoing.

DETAILED DESCRIPTION OF THE PREFERRED EMBODIMENT

Figure 1:
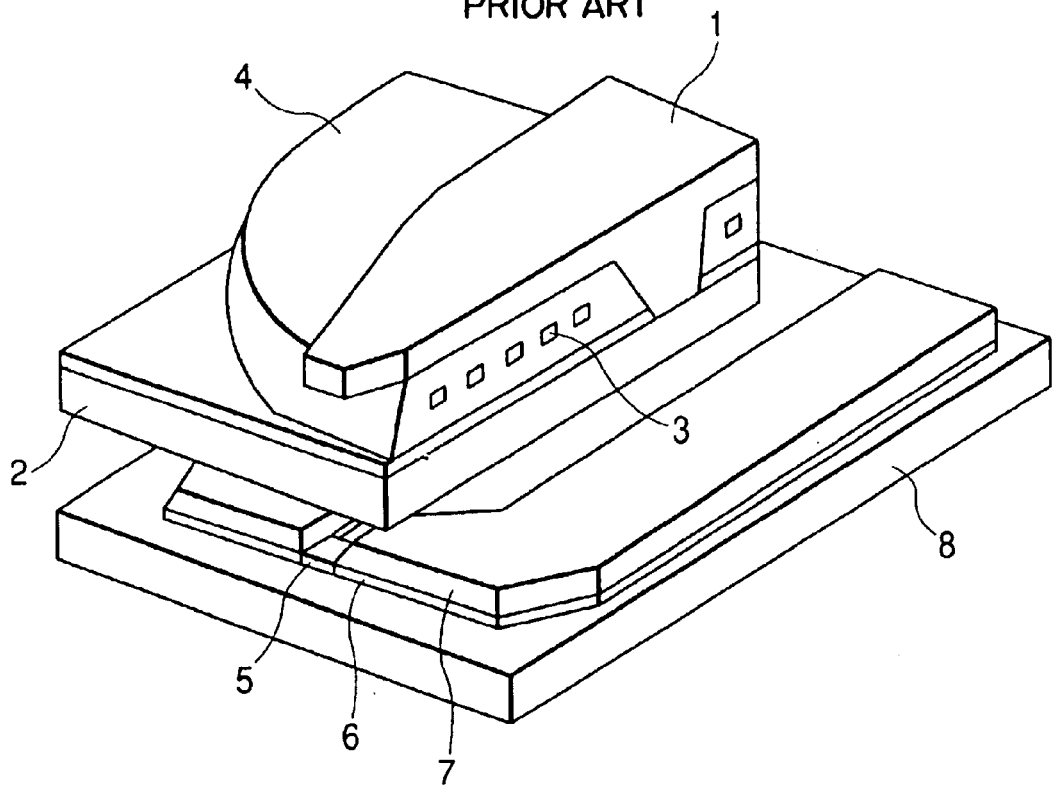
FIG. 1 is a schematic view showing a conventional thin film head which has a read element and a write element for perpendicular magnetic recording.

Next, the preferred embodiments of the present invention will be described with reference to the accompanying drawings. However, the embodiments are not intended to limit the invention in any way. In the following drawings, same function parts will be denoted by same reference numerals, and described in a manner of preventing overlapped explanation.

Figure 13:
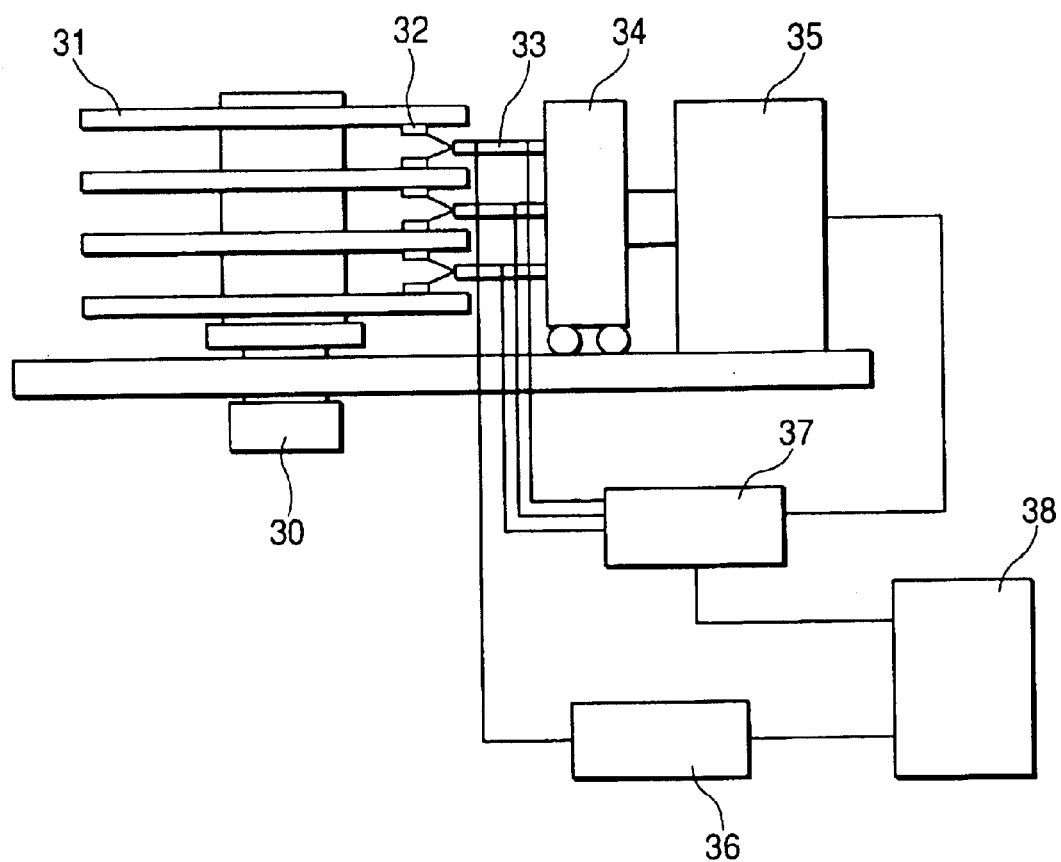
FIG. 13 is a schematic view showing a magnetic disk drive according to the invention.

FIG. 13 is a perspective view showing an example of an entire magnetic disk drive according to the invention. This magnetic disk drive comprises a magnetic disk 31, a motor 30 for rotary-driving the magnetic disk, a magnetic head 32 for recording/reproducing, a suspension 33 for supporting the magnetic head, an actuator 34, a voice coil motor 35, a recording/reproducing circuit 36, a positioning circuit 37, an interface control circuit 38, and others. The magnetic disk 31 includes a double-layer recording medium for perpendicular magnetic recording, and a protective film is covered with a lubricant film.

(First Embodiment)

Figure 2:
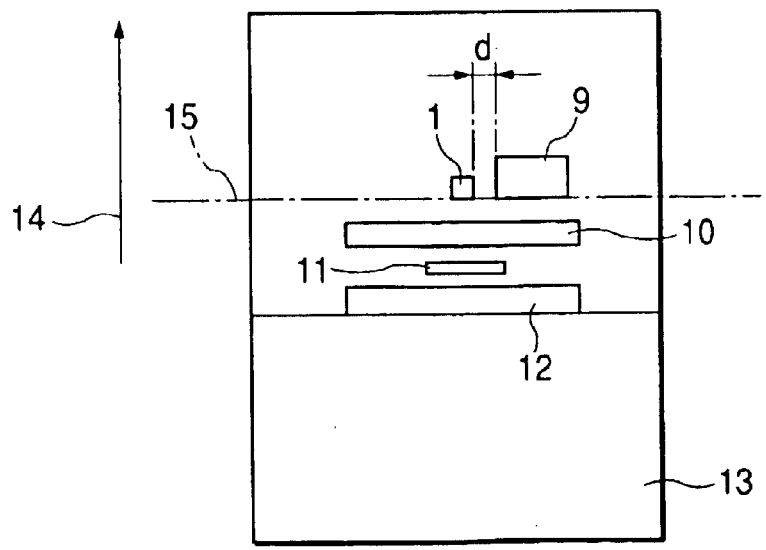
FIG. 2 is a schematic view showing a disposition example of main and auxiliary poles of a magnetic head according to the present invention.

FIG. 2 shows a magnetic head according to the first embodiment of the invention when seen from a surface facing to a medium. In FIG. 2, a flattening film made of $Al_2O_3$ was formed to have a film thickness of 1 µm by a sputtering method on the upper shield 10 (film thickness of 2 µm) of a reproducing head formed on a substrate 13 made of AlTiC. A resist film was formed on the flattening film, and a frame for electroplating was formed by photolithography for the purpose of forming a main pole. Then, a main pole made of an alloy mainly containing permalloy or cobalt/nickel/iron was formed by electroplating. The formed main pole 1 had a length of 0.2 µm in a track width direction, and a height of 0.2 µm in a trailing direction when seen from the surface facing to the medium. In this case, the main pole was disposed in such a way as to set a straight line connecting the main pole 1 with the center of a reproducing element 11 to be roughly parallel to a trailing direction 14. A space between the main pole 1 and the reproducing element 11 was about 3 µm.

Figure 8:
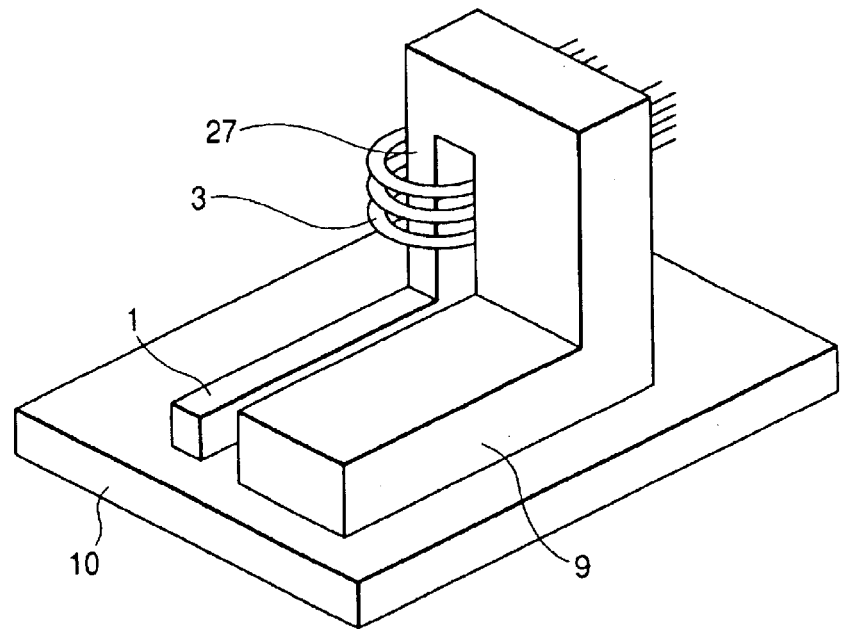
FIG. 8 is a view showing an arrangement example of a coil which creates a magnetic flux for the disposition of FIG. 2.

Subsequently, a frame for electroplating was formed by photolithography for the purpose of forming an auxiliary pole 9 in a place away from the main pole 1 by 1 µm on the flattening film made of $Al_2O_3$ having the main pole 1 formed thereon, and the auxiliary pole 9 was formed by electroplating. A composition of the auxiliary pole was the same as that of the main pole. When seen from the surface facing to the medium, the auxiliary pole 9 had a length of 2 µm in the track width direction, and a height of 2 µm in the trailing direction. In addition, the structure was made, where the main pole 1 and the auxiliary pole 9 were magnetically coupled together as shown in FIG. 8.

A head which has a read element and a write element, which used a GMR element as a reproducing head and used the thin film single pole head for perpendicular magnetic recording formed in the foregoing process as a reproducing head, and the double-layer perpendicular recording medium were combined together to assemble the magnetic disk drive schematically shown in FIG. 13, and then a formatted volume and tracking performance were examined. As a result, compared with the conventional thin film single pole head for perpendicular magnetic recording shown in FIG. 1, it was discovered that the formatted volume was increased by 4%, and the tracking performance was good.

(Second Embodiment)

Figure 3:
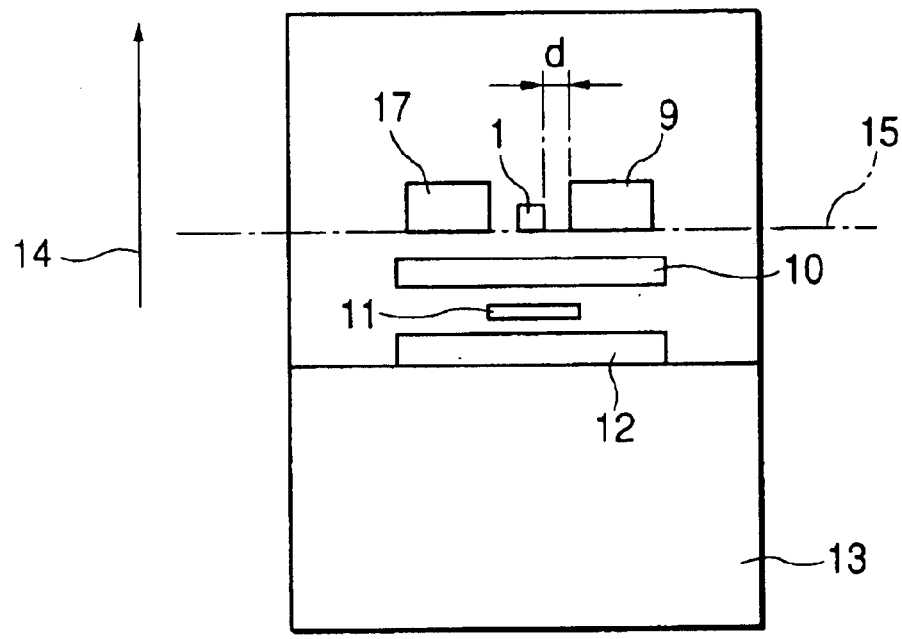
FIG. 3 is a schematic view showing a disposition example of the main and auxiliary poles of the magnetic head of the invention.
Figure 9:
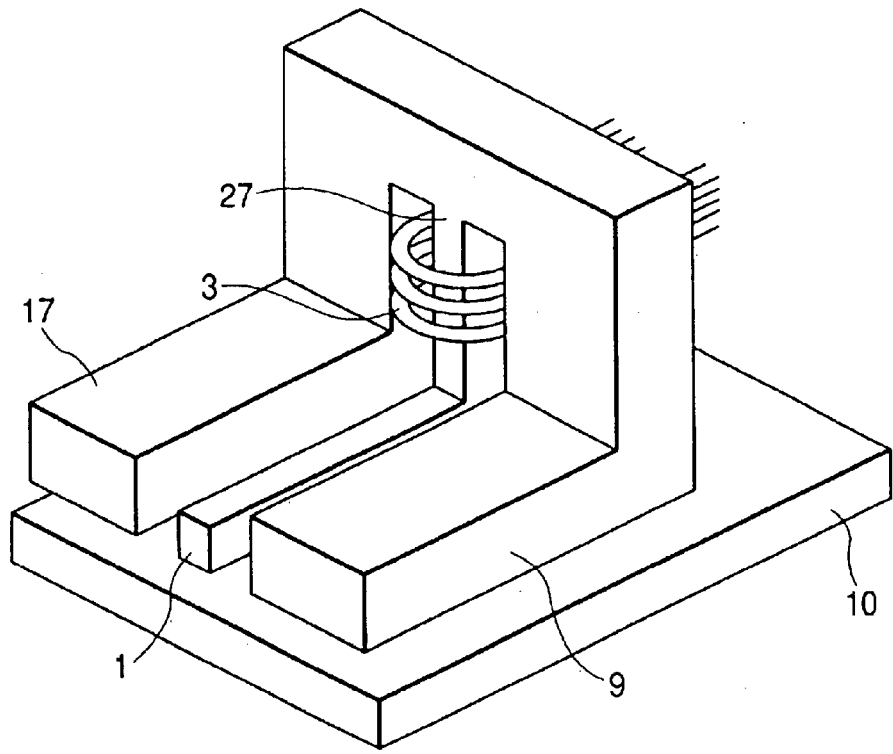
FIG. 9 is a view showing an arrangement example of a coil which creates a magnetic flux for the disposition of FIG. 3.

As shown in FIG. 3, in addition to the auxiliary pole 9 formed in the first embodiment, a second auxiliary pole 17 was formed in an opposite side of the auxiliary pole 9 sandwiching the main pole 1 in a manner similar to that for the first auxiliary pole 9. In this case, a size of the second auxiliary pole 17 and its distance from the main pole 1 were set equal to those of the first auxiliary pole 9. Regarding the main pole 1, and the first and second auxiliary poles 9 and 17, as schematically shown in FIG. 9, a magnetic film pillar parallel to the surface facing to recording media were respectively connected to the poles 1, 9 and 17, and the main pole and the first and second auxiliary poles were magnetically coupled together by connecting the upper sides of the three pillars. Then, a coil which creates a magnetic flux 3 was formed so as to surround the magnetic film pillar 27 connected to the main pole 1.

A head which has a read element and a write element, using a GMR head element as a reproducing head and the above thin film single pole head for perpendicular magnetic recording as a recording head, was produced experimentally. This head and the double-layer perpendicular recording medium were combined to assemble a magnetic disk drive schematically shown in FIG. 13, then the formatted volume and tracking performance were examined. As a result, compared with the conventional thin film single pole head for perpendicular magnetic recording shown in FIG. 1, it was discovered that the formatted volume was increased by 4%, and tracking performance was good.

Further, examination was made as to recording current intensity dependence and recording frequency dependence of a reproducing output characteristic of the head produced experimentally. As a result, compared with the conventional thin film single pole head for perpendicular magnetic recording shown in FIG. 1, it was discovered that no disturbance phenomena of the recording pattern caused by a return magnetic flux like that represented by erasure after recording was difficult to be measured in the head produced experimentally in the present embodiment.

(Third Embodiment)

Figure 4:
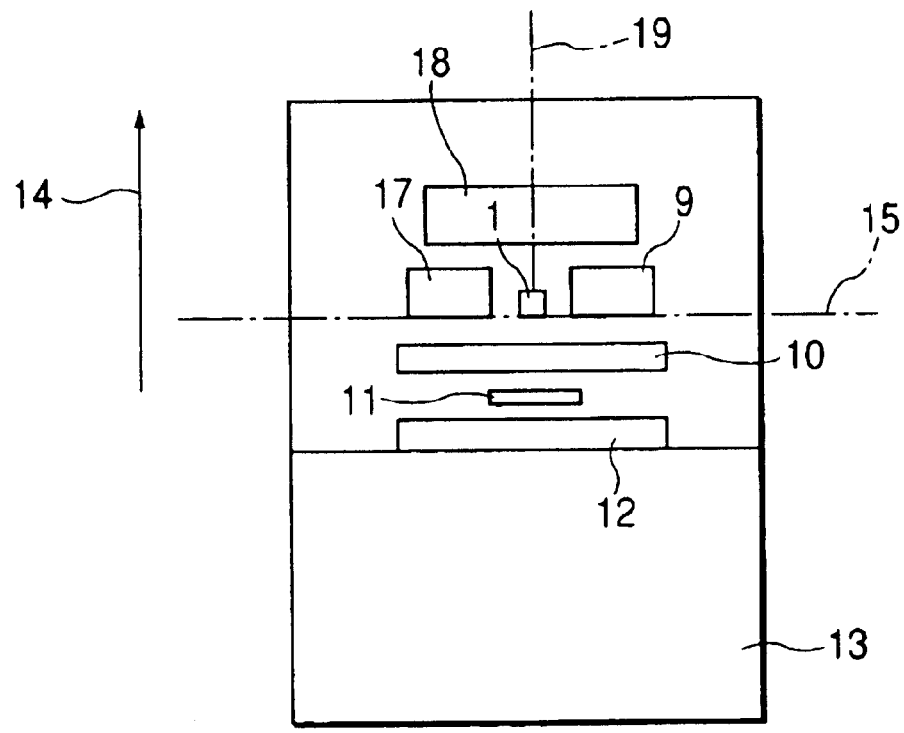
FIG. 4 is a schematic view showing a disposition example of the main and auxiliary poles of the magnetic head of the invention.
Figure 5:
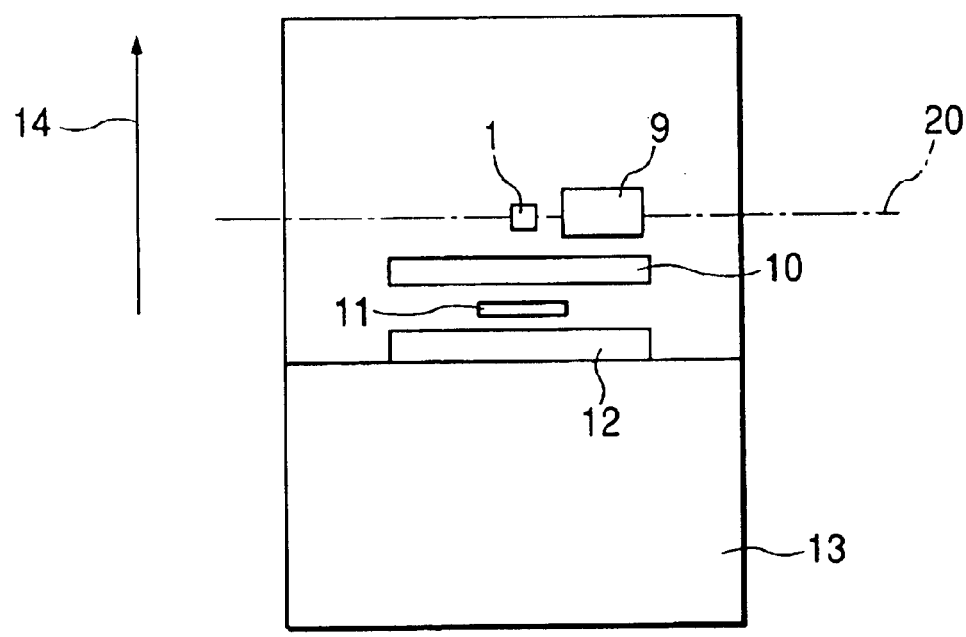
FIG. 5 is a schematic view showing a disposition example of the main and auxiliary poles of the magnetic head of the invention.
Figure 6:
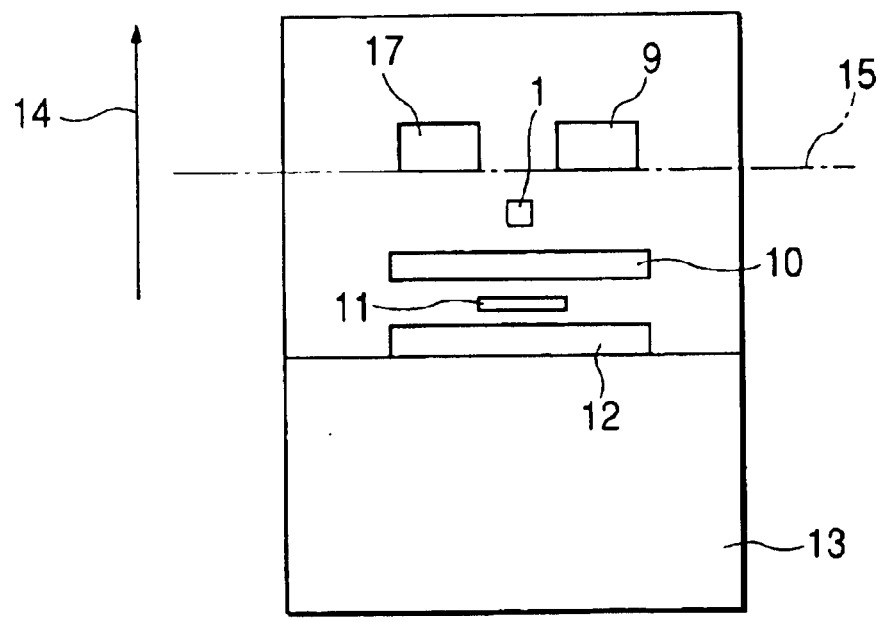
FIG. 6 is a schematic view showing a disposition example of the main and auxiliary poles of the magnetic head of the invention.
Figure 7:
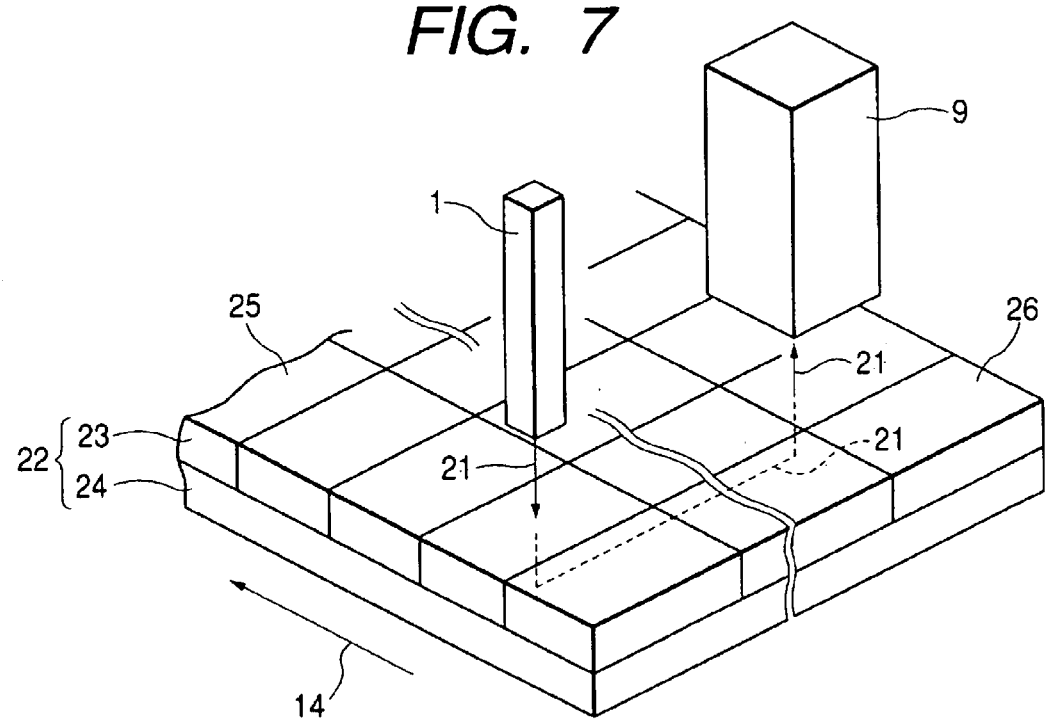
FIG. 7 is a view schematically showing a magnetic flux path, through which a magnetic flux leaked from the main pole enters the auxiliary pole after passing through a recording medium.
Figure 10:
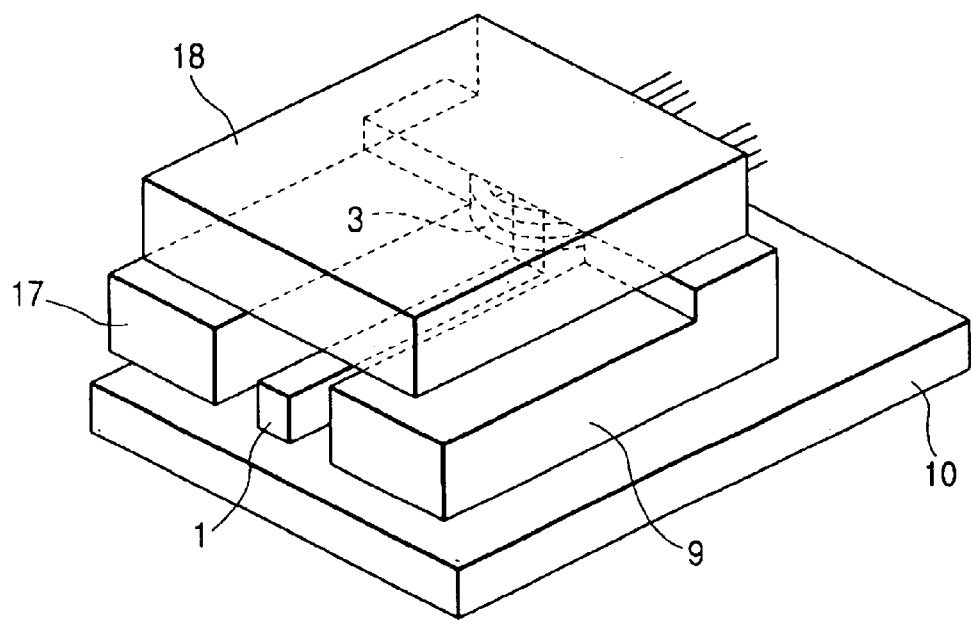
FIG. 10 is a view showing an arrangement example of a coil which creates a magnetic flux for the disposition of FIG. 4.
Figure 11:
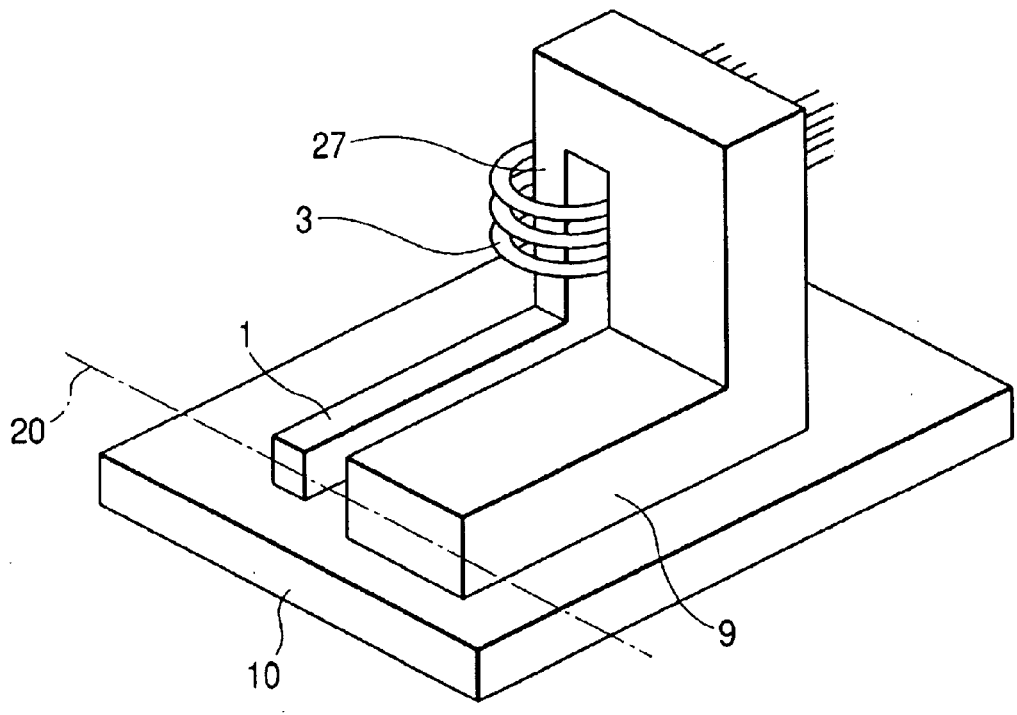
FIG. 11 is a view showing an arrangement example of a coil which creates a magnetic flux for the disposition of FIG. 5.
Figure 12:
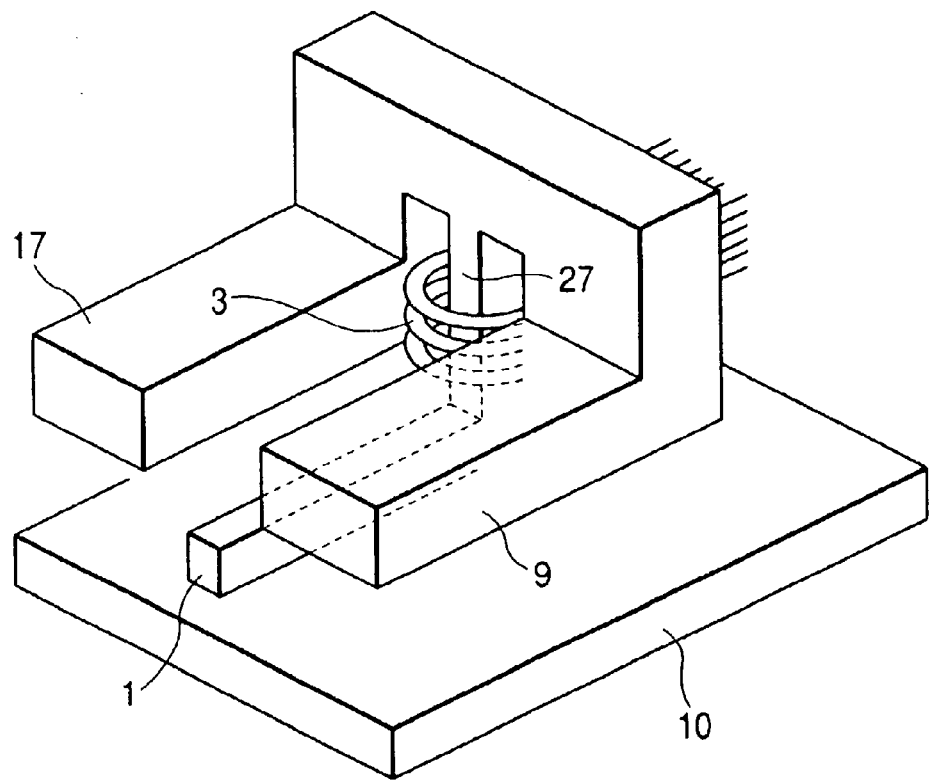
FIG. 12 is a view showing an arrangement example of a coil which creates a magnetic flux for the disposition of FIG. 6.

As shown in FIG. 4, three auxiliary poles 9, 17 and 18 were disposed so as to surround the main pole 1 when seen from the surface facing to the medium. In this case, the first auxiliary pole 9 and the second auxiliary pole 17, and the main pole 1 were formed on the same film which flattens the roughness of underlayers. The sizes of the auxiliary poles 9 and 17 and the main pole 1, and the spaces from one another were set equal to those of the second embodiment. In addition, third auxiliary pole 18, the main pole 1 and the reproducing element 11 were disposed such that the respective centers thereof were positioned on the same straight line roughly parallel to the trailing direction 14. When seen from the surface facing to the medium, the third auxiliary pole 18 had a length of 6 μm in the tracking width direction, and a height of 2 μm in the trailing direction. The main pole 1, and the first, second and third auxiliary poles 9, 17 and 18 were connected as schematically shown in FIG. 10. Specifically, magnetic film pillars parallel to the surface facing to recording media were respectively connected to the main pole 1 and the first and second auxiliary poles 9 and 17. The first, second and third auxiliary poles were magnetically coupled together by connecting the third auxiliary pole 18 to the upper parts of the three pillars. Then, a coil which creates a magnetic flux 3 was formed so as to surround the magnetic film pillar connected to the main pole 1.

A head which has a read element and a write element, using a GMR element as a reproducing head and the thin film single pole head for perpendicular magnetic recording as a recording head, was produced experimentally. Then, this head and the double-layer perpendicular recording medium were combined to assemble a magnetic disk drive schematically shown in FIG. 13, and the formatted volume and tracking performance were examined. As a result, compared with the conventional thin film single pole head for perpendicular magnetic recording as shown in FIG. 1, it was discovered that the formatted volume was increased by 4%, and tracking performance was good. In addition, examination was made as to recording current intensity dependence and recording frequency dependence of a reproducing output characteristic of the head produced experimentally. As a result, compared with the conventional thin film single pole head for perpendicular magnetic recording as shown in FIG. 1, it was discovered that the measurement of the disturbance phenomena of the recording pattern caused by a return magnetic flux like that represented by erasure after recording was difficult.

Furthermore, the head produced experimentally in the present embodiment and the double-layer perpendicular recording medium were combined, and applied magnetic field intensity dependence of a reproducing output characteristic was measured. This measurement was carried out to check a change in reproducing signal intensity by forming a recording pattern beforehand in a predetermined track on the recording medium, and applying a magnetic field in a predetermined direction. At that time, magnetic field intensity was set in the range between 0 and 4000 A/m (about 0 to 50 Oe), as a magnetic field applying direction, the trailing direction 14 and an element height direction orthogonal to the track width direction were selected. Assume that the intensity of reproducing signal was 1 with the intensity of applied magnetic field set at 0 A/m, the intensity of reproducing signal was 0.6 to 0.7 when the intensity of applied magnetic field was 4000 A/m in the case of the conventional thin film single pole head for perpendicular magnetic recording. On the other hand, it was about 0.9 in the case of the head produced experimentally in the third embodiment. As a result, compared with the conventional thin film single pole head for perpendicular magnetic recording shown in FIG. 1, it was difficult for an antenna effect to take place in the case of the head produced experimentally in the third embodiment.

According to the present invention, it is possible to provide a thin film single magnetic pole head for perpendicular magnetic recording, which provides a higher formatted volume than that of the conventional thin film single pole head for perpendicular magnetic recording, and easy servo.

What is claimed is:

1. A magnetic head comprising:
   a reproducing head provided with a pair of magnetic shield layers and a reproducing element formed between these layers; and
   a recording head for perpendicular magnetic recording, provided with a main and an auxiliary poles made of thin films of soft magnetic materials, which are disposed to face each other through a magnetic gap in a surface facing to recording media, and connected inside, and a coil magnetically coupled to a magnetic circuit composed of the main and auxiliary poles,
   wherein the auxiliary pole comprises first, second and third auxiliary poles, each of which is disposed in an area excluding a portion between the reproducing element and the main pole when seen from the surface facing to recording media.

2. The magnetic head according to claim 1, wherein when seen from the surface facing to recording media, a straight line connecting a center of the reproducing element with a center of the main pole has a length of 5 μm or lower when it is projected in a trailing direction.

3. The magnetic head according to claim 1 wherein when seen from the surface facing to recording media, a straight line connecting at least one auxiliary pole with a center of the main pole is non-parallel to a trailing direction.

4. The magnetic head according to claim 1, wherein the main pole and the auxiliary pole are disposed in a manner that a part or all parts of at least one auxiliary pole face a recording track different from a recording track on the recording medium, to which the main pole faces.

5. A magnetic head comprising:

a reproducing head provided with a pair of magnetic shield layers and a reproducing element formed between these layers; and a recording head for perpendicular magnetic recording, provided with a main and an auxiliary poles made of thin films of soft magnetic materials, which are disposed to face each other through a magnetic gap in a surface to recording media, and connected inside, and a coil magnetically coupled to a magnetic circuit composed of the main and auxiliary poles, wherein the auxiliary pole comprises a first, second and third poles, each of which is disposed in an area excluding a portion between the reproducing element and the main pole when seen from the surface facing to recording media, wherein a straight line connecting a center of the first auxiliary pole with a center of the second auxiliary pole is roughly orthogonal to a trailing direction, a straight line connecting a center of the third auxiliary pole with the center of the main pole is roughly parallel to the trailing direction, and an area of the third auxiliary pole is larger than an area of the first or second auxiliary pole.

6. A magnetic disk drive comprising:

a magnetic disk;

disk driving means for driving the magnetic disk;

a magnetic head provided with a reproducing head and a recording head; and means for positioning the magnetic head with respect to the magnetic disk, wherein the magnetic disk is one provided with recording and soft magnetic layers, and designed for perpendicular magnetic recording, and the magnetic head is one specified in claim 1.

* * * * *

UNITED STATES PATENT AND TRADEMARK OFFICE
CERTIFICATE OF CORRECTION

PATENT NO.     : 6,795,277 B2
DATED          : September 21, 2004
INVENTOR(S)    : Y. Tsuchiya et al.

It is certified that error appears in the above-identified patent and that said Letters Patent is hereby corrected as shown below:

Title page,
Insert Item -- [75] Inventors: Yuko Tsuchiya, Tokorozawa (JP); Hiroyuki Hoshiya, Odawara (JP); Yoshiaki Kawato, Tokyo, (JP); Katsuro Watanabe, Odawara (JP); Hiroshi Ide, Kodaira (JP) --

Signed and Sealed this

Third Day of May, 2005

JON W. DUDAS
*Director of the United States Patent and Trademark Office*